United States Patent
Kalweit et al.

(10) Patent No.: US 8,901,768 B2
(45) Date of Patent: Dec. 2, 2014

(54) WASTEGATE CONTROL SYSTEM FOR BOTH CURRENT-CONTROLLED AND ON/OFF PWM-TYPE SOLENOIDS

(75) Inventors: Nicholas John Kalweit, Novi, MI (US); Robert J. Homer, Dexter, MI (US); Michael R. Grimes, Saline, MI (US)

(73) Assignee: GM Global Technology Operations LLC

( * ) Notice: Subject to any disclaimer, the term of this patent is extended or adjusted under 35 U.S.C. 154(b) by 774 days.

(21) Appl. No.: 13/211,804

(22) Filed: Aug. 17, 2011

(65) Prior Publication Data

US 2012/0303239 A1     Nov. 29, 2012

Related U.S. Application Data

(60) Provisional application No. 61/489,419, filed on May 24, 2011.

(51) Int. Cl.
*B60L 1/00*     (2006.01)

(52) U.S. Cl.
USPC .......................................................... 307/9.1

(58) Field of Classification Search
USPC .......................................................... 307/9.1
See application file for complete search history.

(56) References Cited

U.S. PATENT DOCUMENTS 7,631,552 B2 * 12/2009 Keski-Hynnila et al. .. 73/114.74

* cited by examiner

*Primary Examiner* — Robert L. Deberadinis (57) ABSTRACT

A wastegate control system includes a wastegate control module configured to operate in one of a first PWM mode and a second PWM mode. A first transistor includes a control terminal connected to the wastegate control module, a first output terminal, and a second output terminal. A clamp circuit is connected to the first output terminal and the second output terminal of the first transistor. A second transistor includes a control terminal connected to the wastegate control module, a first output terminal, and a second output terminal. A diode has an anode connected to the second output terminal of the first transistor and a cathode connected to the first output terminal of the second transistor.

10 Claims, 6 Drawing Sheets

WASTEGATE CONTROL SYSTEM FOR BOTH CURRENT-CONTROLLED AND ON/OFF PWM-TYPE SOLENOIDS

CROSS-REFERENCE TO RELATED APPLICATIONS

This application claims the benefit of U.S. Provisional Application No. 61/489,419, filed on May 24, 2011. The disclosure of the above application is incorporated herein by reference in its entirety.

FIELD

The present disclosure relates to engine control systems, and more particularly to wastegate control systems for turbocharged engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

A turbocharger is a gas compressor powered by a turbine, which is driven by exhaust gas from the engine. The compressor in the turbocharger increases the pressure of air entering the engine to provide greater power and/or efficiency. A wastegate includes a valve that diverts exhaust gas away from the turbine in turbocharged engine systems. Diversion of exhaust gas regulates the turbine speed, which in turn regulates the rotating speed of the compressor. The wastegate regulates the maximum boost pressure in turbocharged engine systems, which protects the engine and the turbocharger.

SUMMARY

A wastegate control system includes a wastegate control module configured to operate in one of a first PWM mode and a second PWM mode. A first transistor includes a control terminal connected to the wastegate control module, a first output terminal, and a second output terminal. A clamping circuit is connected to the first output terminal and the second output terminal of the first transistor. A second transistor includes a control terminal connected to the wastegate control module, a first output terminal, and a second output terminal. A diode has an anode connected to the second output terminal of the first transistor and a cathode connected to the first output terminal of the second transistor.

In other features, the first PWM mode is an on/off PWM mode and the second PWM mode is a current control PWM mode. When the wastegate control module is operated in the first PWM mode, the wastegate control module outputs a first drive signal to the first transistor. When the wastegate control module is operated in the second PWM mode, the wastegate control module outputs a first drive signal to the first transistor and a second drive signal to the second transistor.

In other features, when the wastegate control module is operated in the first PWM mode, a solenoid is connected to the second output of the first transistor and a relay is connected to the solenoid. When the wastegate control module is operated in the second PWM mode, a relay is connected to the second output of the second transistor and a solenoid is connected to the second output of the first transistor and the first output of the first transistor.

In other features, the clamping circuit comprises a Zener diode or an avalanche field effect transistor (FET). The first transistor and the second transistor comprise metal oxide semiconductor (MOS) transistors.

In other features, a sensing module senses an operating parameter. A configuration module configures the wastegate control module to operate in one of the first PWM mode and the second PWM mode.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

There are two methods of controlling solenoid wastegate valves, which bleed pressure from the turbine and route exhaust gas around the turbo instead of through the turbo. One method uses a control circuit that can open and fully close the wastegate valve using a solenoid every time a drive signal is turned on and off (referred to as an on/off pulse width modulation (PWM) mode). Turn-off is typically achieved using a clamping circuit, which quickly drains energy stored in the solenoid and dissipates the energy in the wastegate control circuit.

Another approach uses a wastegate control circuit that includes a recirculation diode, which allows the valve to be controlled to intermediate, partially-opened positions (not just fully open or fully closed). The PWM duty cycle for this type of driver is proportional to the linear movement of the solenoid. While both methods have advantages, each requires a different type of wastegate control circuit. A wastegate control circuit according to the present disclosure is capable of controlling either the on/off PWM type or the current controlled PWM type solenoid with a single circuit.

Figure 1:
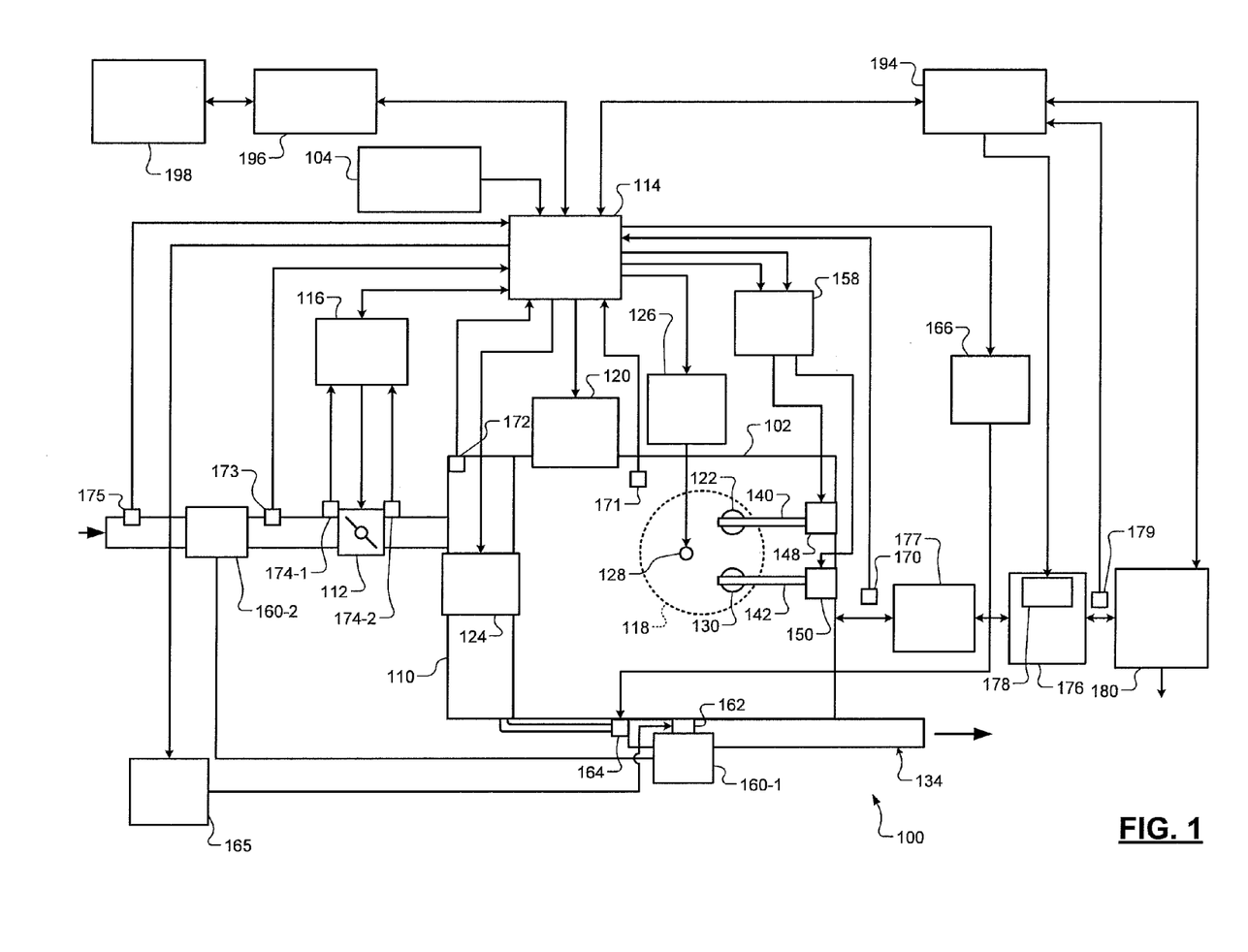
FIG. 1 is a functional block diagram of an example turbocharged engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 165. The boost actuator module 165 may modulate the boost of the turbocharger by controlling the position of the wastegate 162. In various implementations, multiple turbochargers may be controlled by the boost actuator module 165. The turbocharger may have variable geometry, which may be controlled by the boost actuator module 165.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 164, which selectively redirects exhaust gas back to the intake manifold 110. The EGR valve 164 may be located upstream of the turbocharger's turbine 160-1. An EGR actuator module 166 may control the EGR valve 164 based on signals from the ECM 114.

The engine system 100 may measure the speed of the crankshaft in revolutions per minute (RPM) using an RPM sensor 170. The temperature of the engine coolant may be measured using an engine coolant temperature (ECT) sensor 171. The ECT sensor 171 may be located within the engine 102 or at other locations where the coolant is circulated, such as a radiator (not shown).

The pressure within the intake manifold 110 may be measured using a manifold absolute pressure (MAP) sensor 172. In various implementations, engine vacuum, which is the difference between ambient air pressure and the pressure within the intake manifold 110, may be measured. The mass flow rate of air flowing into the intake manifold 110 may be measured using a mass air flow (MAF) sensor 173. In various implementations, the MAF sensor 173 may be located in a housing that also includes the throttle valve 112.

The throttle actuator module 116 may monitor the position of the throttle valve 112 using one or more throttle position sensors (TPS) 174. For example, first and second throttle position sensors 174-1 and 174-2 monitor the position of the throttle valve 112 and generate first and second throttle positions (TPS1 and TPS2), respectively, based on the throttle position. The ambient temperature of air being drawn into the engine 102 may be measured using an intake air temperature (IAT) sensor 175. The ECM 114 may use signals from the sensors and/or one or more other sensors to make control decisions for the engine system 100.

The engine 102 outputs torque to a torque converter 176 via a flywheel 177, such as a dual mass flywheel (DMF). The torque converter 176 includes a torque converter clutch 178, a turbine (not shown), and an impeller (not shown). The turbine drives rotation of a transmission input shaft (not shown). Rotational speed of the turbine (turbine speed) may be measured using a turbine speed sensor 179. For example only, the turbine speed may be measured based on the rotational speed of the transmission input shaft or another suitable parameter indicative of the rotational speed of the turbine of the torque converter 176. Based on a gear ratio selected within a transmission 180, torque is transferred between the transmission input shaft and a transmission output shaft (not shown). Torque may be transferred to wheels of the vehicle via the transmission output shaft.

A transmission control module 194 may control operation of the transmission 180 and the TCC 178. The ECM 114 may communicate with the transmission control module 194 for various reasons, such as to share parameters, and to coordinate engine operation with shifting gears in the transmission 180 and/or operation of the TCC 178. For example, the ECM 114 may selectively reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 165, and the EGR actuator module 166. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
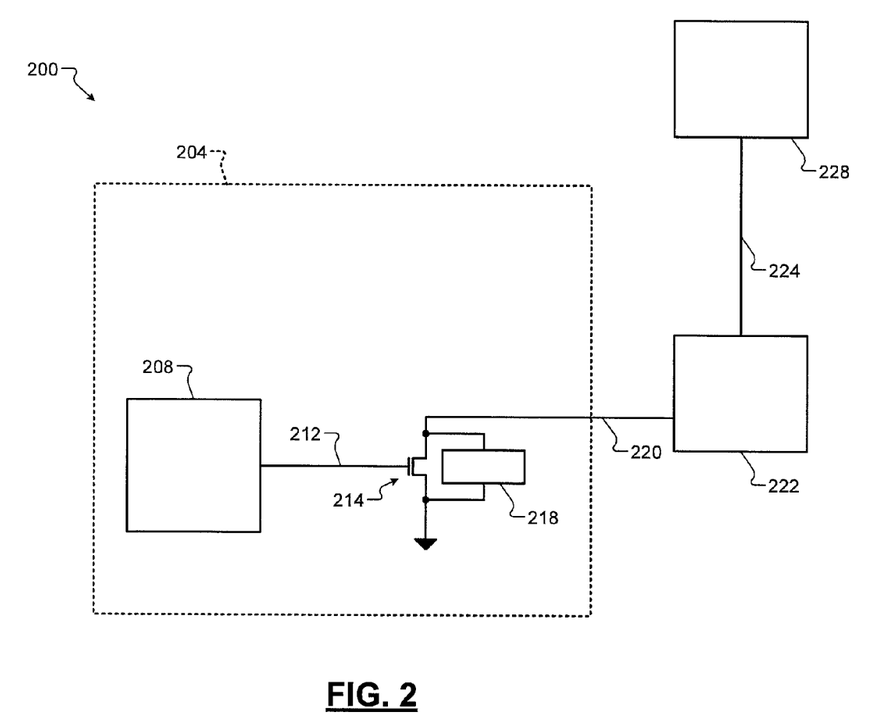
FIG. 2 is a functional block diagram and electrical schematic of an on/off PWM-type wastegate control system.

Referring now to FIG. 2, a first wastegate control system 200 is shown. The first wastegate control system 200 operates the solenoid in an on/off PWM mode. The wastegate control system 200 may be partially implemented by a control module 204, which includes a wastegate control module 208. The wastegate control module 208 generates a drive signal on a conductor 212 that is output to a control terminal of a transistor 214. A clamping circuit 218 is connected across output terminals of the transistor 214. One of the output terminals of the transistor 214 is connected by conductor 220 to a solenoid 222. A relay 228 selectively supplies a switched voltage to the solenoid 222 via a conductor 224. The relay 228 may include a powertrain relay that provides power to components of the powertrain, in part, based on a position of an ignition switch (with or without delays or other input variables).

In use, the relay 228 supplies a voltage signal such as but not limited to 12 V DC to the solenoid 222. The wastegate control module 208 generates the PWM drive signal that is output to the transistor 214. The PWM drive signal allows current to flow or blocks the flow of current through the transistor 214. The solenoid 222 fully opens and closes during each duty cycle. The clamping circuit 218 clamps voltage at turn off and the solenoid 222 closes quickly.

Figure 3:
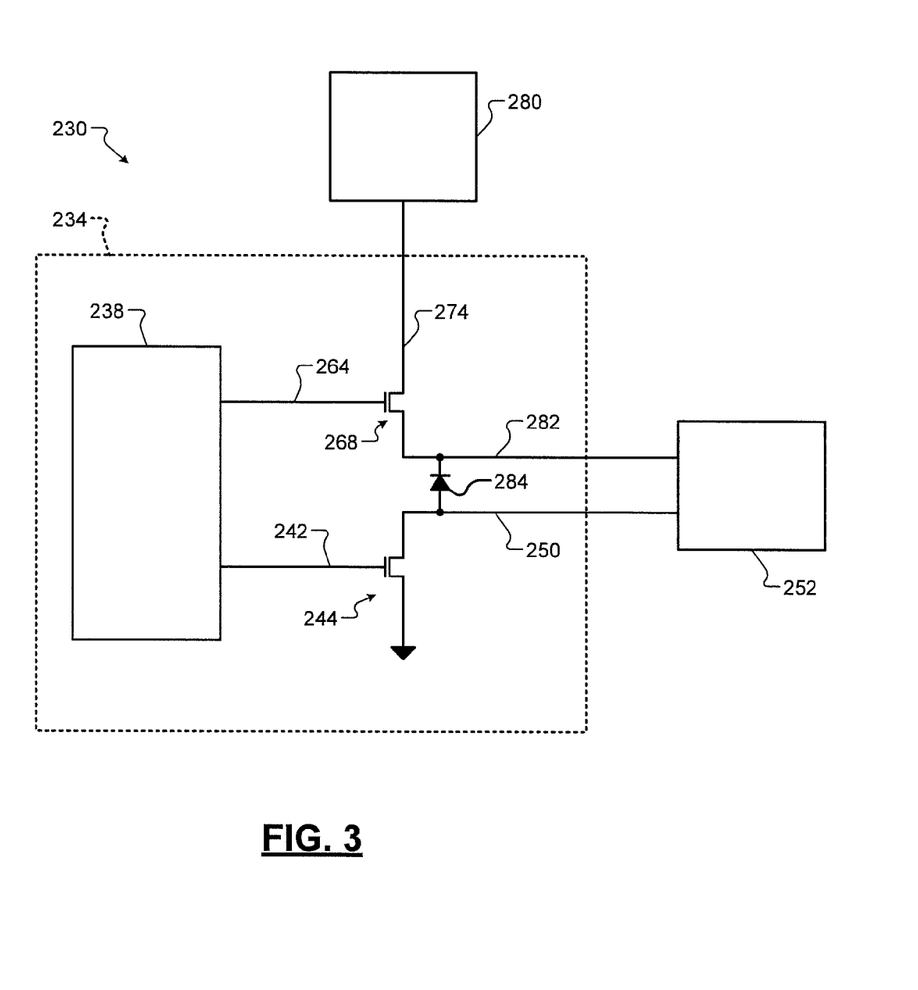
FIG. 3 is a functional block diagram and electrical schematic of a current control-type wastegate control system.

Referring now to FIG. 3, a second wastegate control system 230 is shown. The second wastegate control system 230 operates a solenoid in a current control mode. The second wastegate control system 230 may be partially implemented by a control module 234, which includes a second wastegate control module 238. The wastegate control module 238 generates a first drive signal that is output by a conductor 242 to a control terminal of a transistor 244. One of the output terminals of the transistor 244 is connected by a conductor 250 to a solenoid 252.

The wastegate control module 238 generates a second drive signal that is output by a conductor 264 to a control terminal of a transistor 268. One output terminal 274 of the transistor 268 is connected by a conductor 274 to a relay 280. Another output terminal of the transistor 268 is connected by a conductor 282 to the solenoid 252. A diode 284 is connected between the first and second conductors 250 and 282. More particularly, an anode of the diode 284 is connected to the conductor 250 and a cathode of the diode 284 is connected to the conductor 282.

The relay 280 selectively supplies a switched voltage to the transistor 268. The relay 228 may be a powertrain relay that provides power to components of the powertrain, in part, based on a position of the ignition switch.

In use, the relay 280 selectively supplies power to the control module 204. The wastegate control module 238 generates the first and second drive signals that are output to the transistors 244 and 268, respectively, to linearly control current flowing through the solenoid 252 by varying the duty cycle. The diode recirculates current during the off portion of the duty cycle. The solenoid 252 closes relatively slowly as the current decays during the off portion of the duty cycle.

Figure 4:
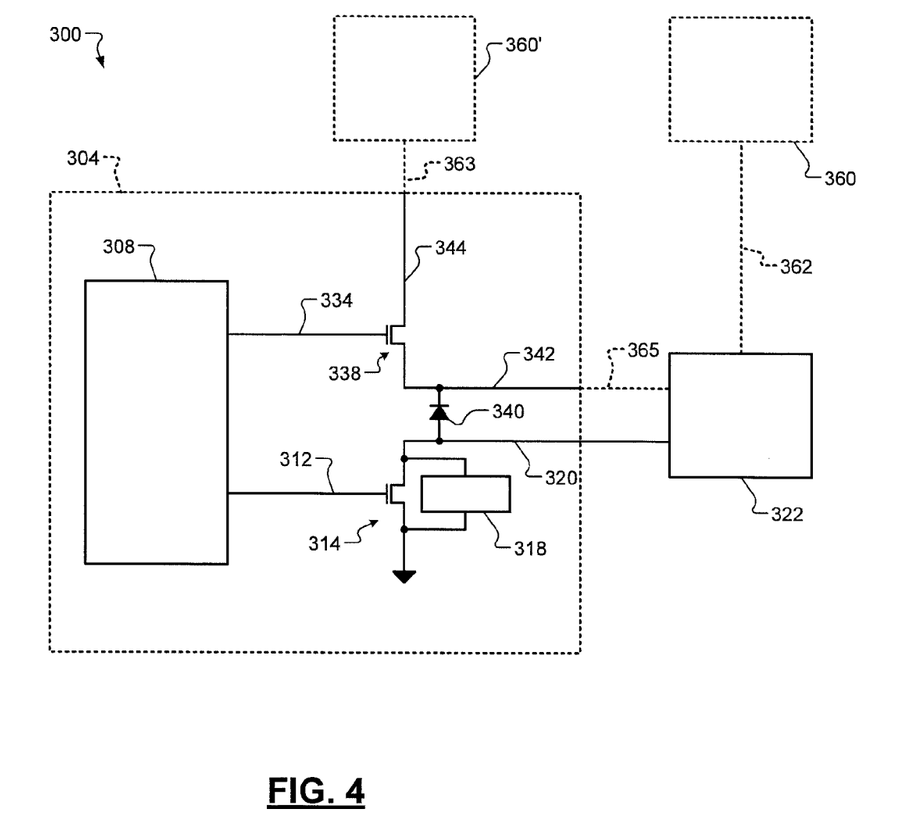
FIGS. 4-6 are functional block diagrams and electrical schematics of examples of control modules that can be used for both on/off PWM-type and current control PWM-type applications according to the present disclosure.

Referring now to FIG. 4, a third wastegate control system 300 is shown. The third wastegate control system 300 can be configured to operate a solenoid in either an on/off PWM mode or a current control mode. A solenoid and a relay are connected by conductors to the third wastegate control system 300 in different locations depending on the desired mode.

The third wastegate control system 300 may be partially implemented by a control module 304, which includes a third wastegate control module 308. The control module 304 may be a stand alone control module or form part of an existing control module such as but not limited to an engine control module, a transmission control module or other vehicle control module.

The wastegate control module 308 generates a first drive signal that is output by a conductor 312 to a control terminal of a transistor 314. A clamping circuit 318 is connected across the output terminals of the transistor 314. One of the output terminals of the transistor 314 is connected by conductors 320 and 321 to a solenoid 322. A second output 334 of the wastegate control module 238 generates a second drive signal that is output to a control terminal of a transistor 338. A diode 340 is connected between the first and second conductors 320 and 342. More particularly, an anode of the diode 340 is connected to the conductor 320 and a cathode of the diode 340 is connected to the conductor 342.

When operating in an on/off PWM mode, a relay 360 is connected by a conductor 362 to the solenoid 322. When operating in a current control PWM mode, the relay 360 and conductor 362 are omitted and a relay 360' is connected by conductors 344 and 363 to one output terminal of the transistor 338. The other output terminal of the transistor 338 is connected by conductors 342 and 365 to the solenoid 322. The conductors 363 and 365 and the relay 360' are omitted when operating in the on/off PWM mode.

Figure 5:
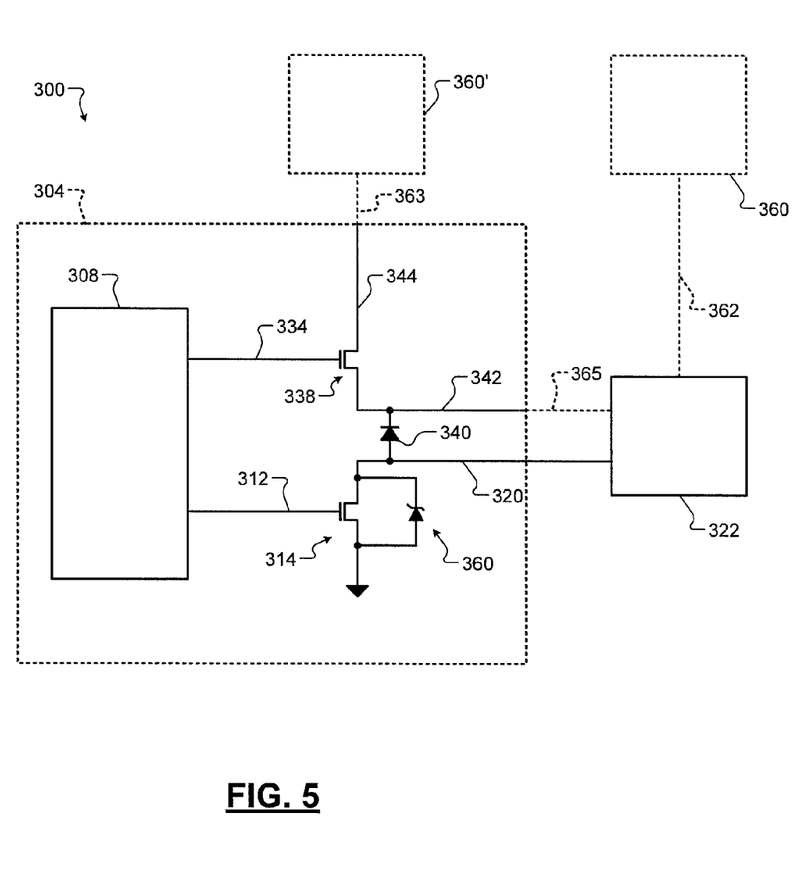
Figure 6:
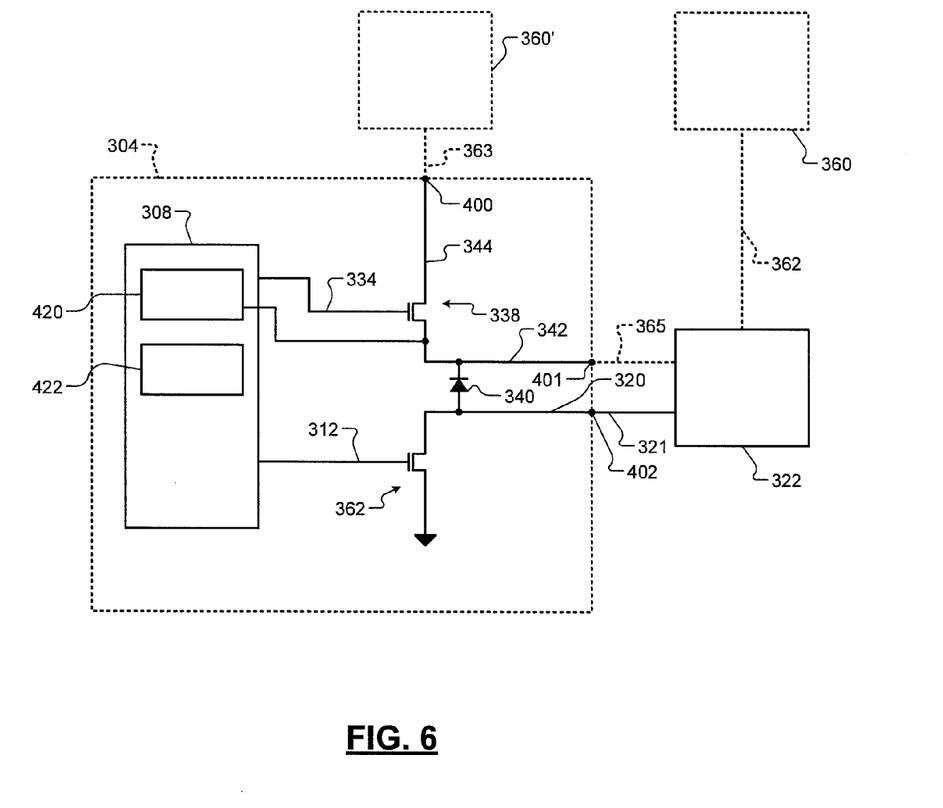

Referring now to FIGS. 5 and 6, non-limiting examples of the clamping circuit 318 are shown. In FIG. 5, the clamping circuit comprises a Zener diode 360. In FIG. 6, an avalanche field effect transistor (FET) 362 replaces the transistor 314 and a separate clamping circuit is omitted. As can be appreciated, other types of clamping circuits may be used.

For example only, the transistors 314 and 338 may include MOS transistors such as PMOS or NMOS transistors with a gate, source and drain. In some implementations, the control module 304 is implemented by an integrated circuit. The conductors 320, 321, 363 and 365 connect to first, second and third pins 400, 401, and 402, respectively, of the integrated circuit when operating in the current control PWM mode. The conductors 363 and 365 are omitted when operating in the on/off PWM mode.

A single control module can use a single drive circuit to support two different types of wastegates. As a result, the wastegate control system of the present disclosure provides a cost-savings over implementing two different control circuits in the same module to support these two types of wastegates. There is also a circuit board space and pin-count savings on a control module that implements this circuit. Either type of wastegate solenoid can be supported with a single control output, simply by the way it is wired to the control module.

In some implementations, one or more additional conductors can be provided to sense a configuration of the wastegate control system as installed. For example, in FIG. 6, the wastegate control module 308 is further connected to the first output terminal of the transistor 338. The wastegate control module 308 includes a sensing module 420 and a configuration module 422. The sensing module 420 senses an operating parameter after an event such as but not limited to the transistor 314 being turned on. For example, the sensing module 420 may sense voltage, current, resistance or another parameter after the event.

For example only, the configuration module 422 may configure the wastegate control module 308 in the on/off PWM mode when the sensing module does not sense low voltage at pin 401 after the event. The configuration module 422 configures the wastegate control module 308 in the current control PWM mode when the sensing module 420 senses voltage at pin 400 after the event. In other implementations, the sensing module 420 other pins may be sensed instead of or in addition to pin 400. Alternately, the sensing module 420 may sense current. Still other variations are contemplated.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A wastegate control system, comprising:
a wastegate control module configured to operate in one of a first PWM mode and a second PWM mode;
a first transistor including:
   a control terminal connected to the wastegate control module;
   a first output terminal; and
   a second output terminal;
a clamp circuit connected to the first output terminal and the second output terminal of the first transistor;
a second transistor including:
   a control terminal connected to the wastegate control module;
   a first output terminal; and
   a second output terminal; and
a diode having an anode connected to the second output terminal of the first transistor and a cathode connected to the first output terminal of the second transistor.

2. The wastegate control system of claim 1, wherein the first PWM mode is an on/off PWM mode and the second PWM mode is a current control PWM mode.

3. The wastegate control system of claim 2, wherein
when the wastegate control module is operated in the first PWM mode, the wastegate control module outputs a first drive signal to the first transistor; and
when the wastegate control module is operated in the second. PWM mode, the wastegate control module outputs a first drive signal to the first transistor and a second drive signal to the second transistor.

4. The wastegate control system of claim 2, wherein
when the wastegate control module is operated in the first PWM mode, a solenoid is connected to the second output of the first transistor and a relay is connected to the solenoid; and
when the wastegate control module is operated in the second PWM mode, a relay is connected to the second output of the second transistor and a solenoid is connected to the second output of the first transistor and the first output of the first transistor.

5. The wastegate control system of claim 1, wherein the clamping circuit comprises a Zener diode.

6. The wastegate control system of claim 1, wherein the clamping circuit comprises an avalanche field effect transistor (FET).

7. The wastegate control system of claim 1, wherein the first transistor and the second transistor comprise metal oxide semiconductor (MOS) transistors.

8. The wastegate control system of claim 1, further comprising:
a sensing module that senses an operating parameter of the wastegate control module in response to an event; and
a configuration module that configures the wastegate control module to operate in one of the first PWM mode and the second PWM mode based on the sensed operating parameter.

9. The wastegate control system of claim 8, wherein the sensing module senses voltage.

10. The wastegate control system of claim 1, wherein the wastegate control system is implemented an integrated circuit.

* * * * *